United States Patent [19]

Komiyama et al.

[11] 4,164,913

[45] Aug. 21, 1979

[54] COMBUSTION CHAMBER FOR AN INTERNAL COMBUSTION ENGINE OF DIRECT INJECTION TYPE

[75] Inventors: Kunihiko Komiyama; Seikichi Kanai; Masaru Okada, all of Oyama, Japan

[73] Assignee: Kabushiki Kaisha Komatsu Seisakusho, Tokyo, Japan

[21] Appl. No.: 830,345

[22] Filed: Sep. 2, 1977

[30] Foreign Application Priority Data

Sep. 2, 1976 [JP] Japan ............................ 51/104309
Nov. 12, 1976 [JP] Japan ........................ 51/151199[U]
Nov. 12, 1976 [JP] Japan ........................ 51/151200[U]

[51] Int. Cl.² ............................................ F02B 3/00
[52] U.S. Cl. ........................... 123/30 C; 123/30 D; 123/193 P
[58] Field of Search ................ 123/30 C, 30 D, 32 A, 123/32 ST, 193 P

[56] References Cited

U.S. PATENT DOCUMENTS

| | | | |
|---|---|---|---|
| 3,814,068 | 6/1974 | Kimbara et al. | 123/32 A |
| 3,872,841 | 3/1975 | Kimbara et al. | 123/32 A |
| 3,892,221 | 7/1975 | Kimbara et al. | 123/32 ST |
| 3,945,351 | 3/1976 | Kimbara et al. | 123/32 B |

Primary Examiner—Edgar W. Geoghegan
Attorney, Agent, or Firm—Armstrong, Nikaido, Marmelstein & Kubovcik

[57] ABSTRACT

A combustion chamber for an internal combustion engine of the direct injection type formed by a cylinder head, a cylinder liner and a piston head, the piston head having formed therein a cavity in which the air swirl can be produced by known means.

A fuel injection nozzle is disposed substantially in the central part of said cavity for injecting jets of fuel radially against the cavity wall.

Said cavity comprises an equilateral polygonal cavity formed in the upper part of said piston head and a toroidal cavity formed continuously to said polygonal cavity in the lower part of said piston head.

7 Claims, 16 Drawing Figures

COMBUSTION CHAMBER FOR AN INTERNAL COMBUSTION ENGINE OF DIRECT INJECTION TYPE

BACKGROUND OF THE INVENTION

This invention relates to a combustion chamber for internal combustion engines of the direct injection type, and more particularly to a combustion chamber which can reduce the level of noise (hereinafter referred to as the noise generated by combustion) and can also reduce the amount of nitrogen oxide (hereinafter referred to as NOx).

It is well known in the field of the art that in internal combustion engines if the timing of injection of fuel into the combustion chamber is delayed to some extent so as to reduce the explosion pressure and the rate of increase thereof the level of the noise generated by fuel combustion can be reduced and at the same time the combustion gas temperature can be lowered thereby reducing the amount of NOx.

However, there encounters a difficulty that in general when the timing of fuel injection is delayed the thermal efficiency of the Diesel cycle will be lowered so as to increase the fuel consumption rate, and so imperfect combustion is caused thereby producing black exhaust gas or smoke.

Stated in brief, the fuel consumption rate is a function of $dM/dt \cdot S \cdot Tm \cdot Td \cdot d\theta/dt$, and in a similar manner the color of exhaust gas, NOx, and the noise generated by combustion are a function of $dM/dt \cdot S \cdot Tm \cdot Td \cdot d\theta/dt$, respectively.

A delay in injection timing serves to reduce an ignition lag Td, and therefore as a mean cycle gas temperature Tm and a heat generation coefficient $d\theta/dt$ are reduced the velocity of mixing fuel and air $dM/dt$ and the time and space distribution "S" of mixing ratio will be reduced.

Accordingly, if the timing of fuel injection is delayed the level of noise generated by fuel combustion and the amount of NOx can be reduced; however, the fuel consumption rate will be increased thereby generating black exhaust gas or smoke based on the above-mentioned relationship.

In order to eliminate such difficulty it is only necessary to increase the air and fuel mixing speed $dM/dt$ at the time of delaying the fuel injection timing or increase the combustion speed after the fuel ignition. Stated more specifically, the emission of black exhaust gas and increase in fuel consumption rate are due to the fact that the combustion process is maintained even after the piston has reached its top dead centre, and so in order to eliminate the above-mentioned disadvantage, it is necessary to increase the combustion speed thereby shortening the combustion period.

In order to increase the combustion speed, it is required to increase the air flow (in particular, the air flow after the fuel ignition) within the combustion chamber.

The term "air flow" employed herein is meant by a large swirl motion generated in the combustion chamber and a resultant turbulence of a small scale.

To produce the above-mentioned air flow, there is conventionally provided a quadrilateral combustion chamber having a quadrilateral cavity formed in the upper part or top of a piston.

The combustion chamber of this form enables air turbulences of a small scale to be produced by a large air swirl motion in the corner square parts thereof so that a strong air flow can be produced therein.

However, the combustion chamber of such shape is disadvantageous in that the intensity of the turbulence of a small scale generated in the corner square parts and that of the large swirl are contrary to each other. In brief, if radius "R" of the corner square parts is comparatively smaller than radius "Ro" of the inscribed circle of the quadrilateral cavity (if the ratio R/Ro is reduced) the intensity of air turbulences of a small scale generated in the corner square parts can be increased; therefore the intensity of the large air swirl motion will be reduced. If the ratio R/Ro is increased, the intensity of the large air swirl can be increased, whilst the air turbulence of a small scale generated in the corner square parts will be reduced.

In any case, the combustion chamber of the conventional shape cannot afford increased turbulences of a small scale and the large air swirl motion at the same time, and further the turbulences can be produced only in the corner square parts so that a sufficiently large air flow cannot be produced therein.

SUMMARY OF THE INVENTION

It is therefore an object of the present invention to provide a combustion chamber having an equilateral polygonal cavity and a toroidal cavity formed continuously to said equilateral polygonal cavity in the piston head which is capable of producing a theoretical combustion process.

Another object of the present invention is to provide a combustion chamber which can produce improved air flow therein by the action of two air swirls produced in the equilateral polygonal cavity and in the toroidal cavity, respectively.

A further object of the present invention is to provide a combustion chamber whereby the angle of impingement of the fuel against the cavity wall and the wetted area thereon can be adjusted so as to attain mixing of the fuel and air.

In accordance with the present invention, there is provided a combustion chamber for use in an internal combustion engine of direct injection type which is defined by a cylinder head, a cylinder liner and a piston head, the piston head having formed therein a cavity in which the air swirl can be produced by known means.

Said cavity comprises an equilateral polygonal cavity formed in the upper part of said piston head and a toroidal cavity formed continuously to said polygonal cavity in the lower part of said piston head.

A fuel injection nozzle is disposed substantially in the central part of said cavity for injecting jets of fuel radially against the cavity wall.

A relatively low speed swirl is produced in the polygonal cavity even in the high engine speed region, while maintaining an adequate swirl intensity in the low-speed region.

A relatively high speed swirl is produced in the toroidal cavity, on the other hand, in the high engine speed region thereby producing an air turbulence between said two swirls so as to produce improved air flow in the combustion chamber.

These and other objects, features and advantages of the present invention will be readily apparent from the following description taken in conjunction with the accompanying drawings.

DETAILED DESCRIPTION OF THE PREFERRED EMBODIMENTS

The present invention will now be described in detail below with reference to the accompanying drawings.

Figure 1:
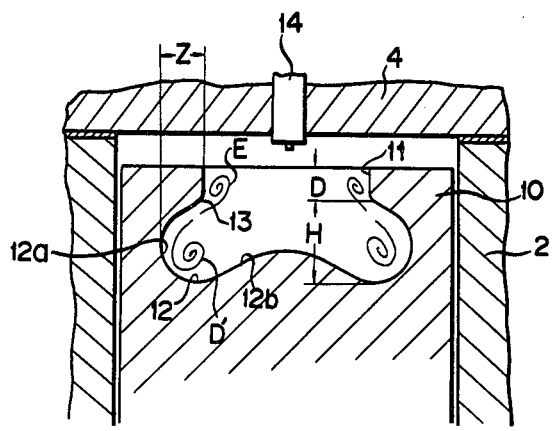
FIG. 1 is a sectional view of a combustion chamber according to the present invention.
Figure 2:
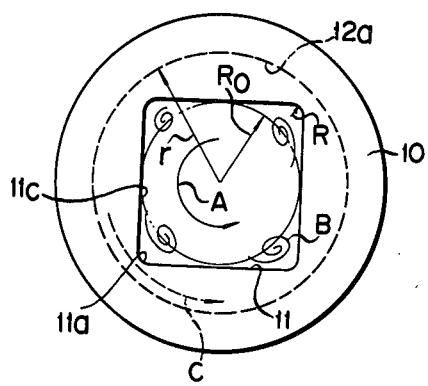
FIG. 2 is a plan view of the piston head of FIG. 1.

Referring to FIG. 1, reference numeral 2 denotes a cylinder liner, and 4 a cylinder head having a fuel injection nozzle 14 mounted in the approximately central part thereof.

Reference numeral 10 represents a piston having an upper quadrilateral cavity 11 and a lower toroidal or round-shaped cavity 12 cast or formed integrally or continuously in the vertical direction.

Round corners 11a of the upper quadrilateral cavity 11 are located inwards relative to inner peripheral walls 12a of the lower toroidal cavity 12. Inner peripheral wall 12a is smoothly curved in the vertical direction, and a part 13 connecting the inner peripheral wall 12a of the toroidal cavity 12 and the inner peripheral wall 11b of the upper quadrilateral cavity 11 is smoothly curved. The lower rounded cavity 12 has a bottom wall 12b having a convex angular or mountainous cross-section.

Further, in the embodiment of the present invention the upper quadrilateral cavity 11 having a depth "D" and the lower toroidal cavity 12 having a depth "H" are formed so as to have a ratio therebetween or D/H of 0.75.

For this purpose, the inner peripheral wall 11b of the upper quadrilateral cavity 11 overhangs relative to the inner peripheral wall 12a of the lower toroidal cavity 12 by a dimension of "Z".

Further, jets of fuel can be directed to or slightly below the connection part 13.

Thus, an upper large swirl "A" is produced by a known means within the upper quadrilateral cavity 11, air turbulences "B" of a small scale are produced in the rounded corner regions 11a, and a lower large swirl "C" is produced within the lower toroidal cavity 12.

At the same time, air turbulences "D'" and "E" of a small scale can be produced in the curved inner peripheral wall 12a and in the connection part 13.

Further, during the suction stroke the upper large swirl "A" and the lower large swirl "C" are produced by a known means provided in suction parts. Due to a strong friction occurring between the upper large swirl "A" and side parts 11c of the upper quadrilateral cavity 11, the swirl motion of the upper large air swirl "A" is reduced, so that the intensity of the lower large swirl "C" will become greater than that of the upper large swirl "A".

Stated in brief, because the swirl speed of the lower large swirl "C" is greater than that of the upper large swirl "A", a turbulence due to shear flow is produced between the upper large swirl "A" and the lower large swirl "C".

The intensity of the turbulence due to shear flow varies depending on D/H or the ratio of the depth "D" of the upper quadrilateral cavity 11 and the depth "H" of the lower toroidal cavity 12.

Figure 3:
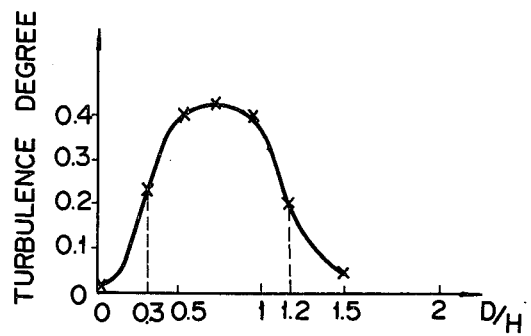
FIG. 3 is a graph showing a relationship between the ratio of the depth of the polygonal cavity to that of the toroidal cavity and the degree of turbulence of the fluid flow in both cavities.

FIG. 3 shows the degree of turbulences obtained by varying the ratio D/H where the ratio of the inside radius r of the lower toroidal cavity 12 to the radius Ro of the inscribed circle of the upper quadrilateral cavity 11 or r/Ro is set at 1.2. It can be seen from the graph that a satisfactory strong air turbulence can be produced if the ratio D/H is set in the range of 0.3 to 1.2. More preferably, D/H is in the range of 0.5 to 1.0.

From the graph shown in FIG. 3, it is to be understood that the degree of turbulence is obtained by dividing the vertical Reynolds shearing stress by the square of mean swirl flow.

Further, since the amount of overhang "Z" varies in the circumferential direction, the intensities of turbulences D' and E of a small scale vary circumferentially so as to produce shear flows in these regions so that the turbulences "D'" and "E" will become more complex.

Thus, various kinds of swirls and turbulences can be produced in the combustion chamber so as to increase air flow in it, and therefore the fuel combustion speed can be increased, and the fuel consumption rate can be reduced thereby eliminating generation of black exhaust gas.

A concrete combustion process will now be described below.

Figure 4:
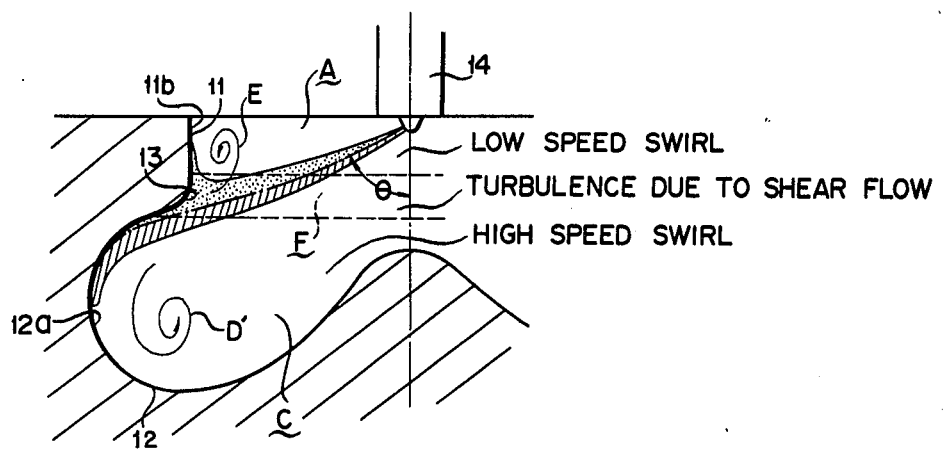
FIG. 4 is an explanatory view showing a behaviour of mixing the fuel injected by the nozzle with air.

As shown in FIG. 4, jets of fuel injected by a fuel injection nozzle 14 are dispersed or separated at the connection part 13 serving as a boundary into two directions of flows i.e., one to be directed to the upper quadrilateral cavity 11 and the other to be directed to the lower toroidal cavity 12. The jets of fuel are injected obliquely from the above into the combustion chamber so that they pass at first through the upper large swirl region "A" (hereinafter referred to as low speed swirl region) having a low swirl speed, and then pass through turbulence region "F" and thereafter reach the lower large swirl region "C" (hereinafter referred to as high speed swirl region) having a high swirl speed.

Since the jets of fuel are directed to the connection part 13 or slightly below the part 13, they are allowed to pass through the intermediate turbulence region "F" for the longest time. It will be obvious that the most excellent mixing of fuel and air takes place when jets of fuel are passing through the air turbulence region "F".

Figure 5:
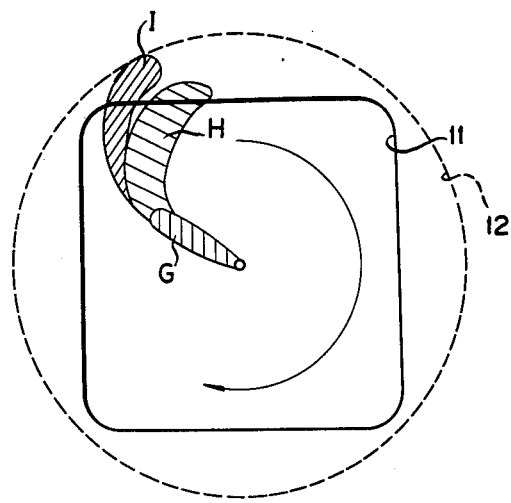
FIG. 5 is also an explanatory plan view showing a behaviour of mixing the fuel injected by the nozzle with air.
Figure 6:
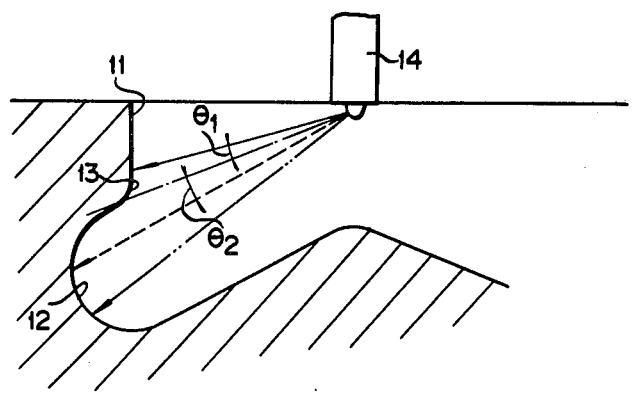
FIG. 6 is an explanatory view showing fuel injection angle relative to the nozzle.

Referring to FIG. 5 showing the behaviour of mixing the fuel injected by the nozzle with air, jets of fuel pass through the low speed swirl region (Region "G") without being forced by the swirl, and then enter the region "H" where the jets of fuel are satisfactorily mixed with air by the turbulence while they are being forced by the swirl to some degree. However, comparatively coarse fuel particles cannot be sufficiently mixed with air even in the air turbulence region. Thereafter, coarse fuel particles will meet the high speed air flow in the high speed swirl region so that decomposition and vaporization of the fuel particles are accelerated thereby satisfactorily mixing the fuel particles with air (Region "I").

Further, it is needless to say that the air turbulences B, D' and E of a small scale contribute to the above-mentioned formation of mixed vapour. The rate of fuel jets passing through the air turbulence region and their passing condition can be controlled by changing injection angle θ shown in FIG. 4.

Figure 7:
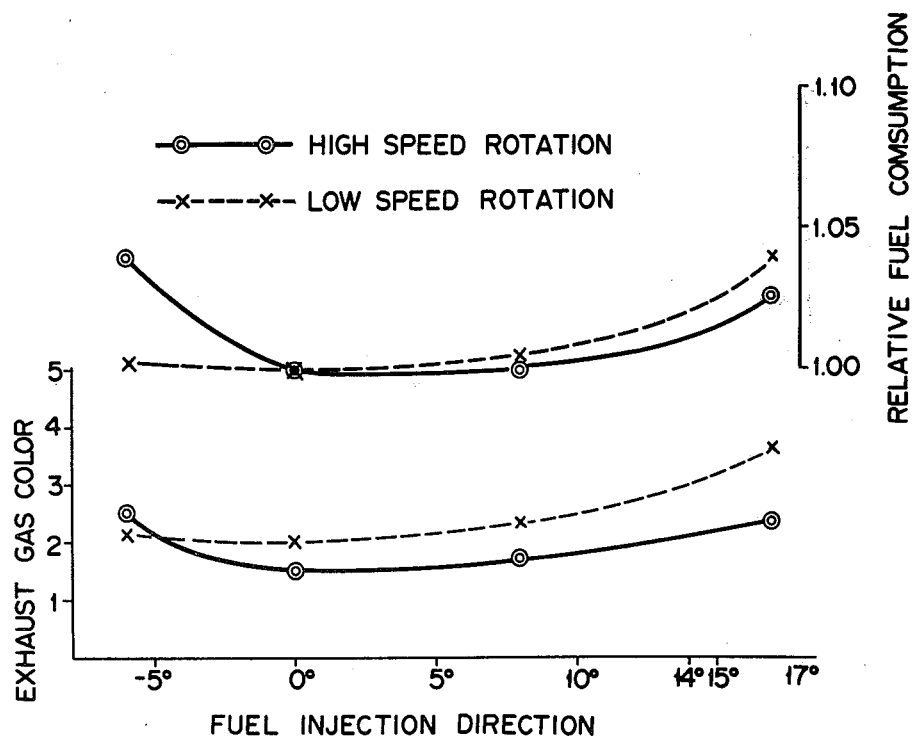
FIG. 7 is a graph showing comparison tests of exhaust gas color as well as relative fuel consumption rate by changing the direction of fuel injection.

Stating in brief, where the upper injection angle $\theta_1$ and the lower injection angle $\theta_2$ relative to the connection part 13 were varied to measure the color of exhaust gas and the relative fuel consumption rate, the result as shown in FIG. 7 was obtained.

This graph shows that satisfactory result can be obtained when the upper injection angle $\theta_1$ is about 5 degrees and the lower injection angle $\theta_2$ is up to about 14 degrees. A more desirable fuel injection angle ranges from 0 degrees to about 4 degrees.

As mentioned hereinabove, air swirls and turbulences due to shear flow exist in the whole combustion chamber so as to produce sufficiently large air flow so that jets of fuel injected therein from the beginning of injection to the completion of injection can be sufficiently mixed with air thereby increasing the combustion speed or rate.

Further, in order to increase further the fuel combustion speed or rate after the ignition, it is necessary to burn the fuel remaining in every part of the combustion chamber after completion of the injection.

For this purpose, the above-mentioned local existence of turbulences in the combustion chamber is effective, but the existence of swirls is more important to achieve the overall excellent mixing effect.

In the above-mentioned embodiment of the present invention, because of high swirl speed the lower large swirl "C" within the lower toroidal cavity 12, upon completion of fuel injection and commencement of down stroke of the piston, the lower large switch "C" existing in the lower part of the combustion chamber will move upwards towards the upper quadrilateral cavity 11 so as to mix the fuel particles with air sufficiently thereby increasing further the fuel combustion speed or rate. At the same time air flow equivalent to so-called squish takes place so as to produce air turbulences of a small scale in the lower part of the upper quadrilateral cavity 11.

In brief, the lower toroidal cavity 12 serves not only to produce a swirl speed difference between the upper large swirl "A" and the lower large swirl "C", but also as a high speed swirl storage chamber for forming swirls again in the whole combustion chamber during the down stroke of the piston.

Further, even if the ratio R/Ro of the radius of the rounded corners 11a to that of the inscribed circle of the upper quadrilateral cavity 11 is reduced, there is no large loss in swirl energy in the whole combustion chamber because of the high swirling speed of the lower large swirl "C" within the lower toroidal cavity 12. Accordingly, the intensity of the turbulence "B" of a small scale can be increased thereby mixing fuel particles with air sufficiently.

Figure 8:
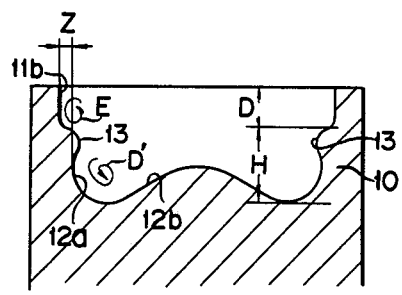
FIG. 8 is similar to FIG. 1 but showing another embodiment of the present invention with cylinder part omitted.
Figure 9:
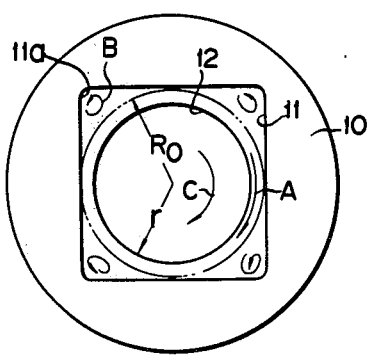
FIG. 9 is similar to FIG. 2 but showing the embodiment of FIG. 8.

FIGS. 8 and 9 illustrate another embodiment of the present invention. This embodiment differs from the aforementioned embodiment in that the inner peripheral wall 12a of the lower toroidal cavity 12 is located inside the inscribed circle of the upper quadrilateral cavity 11. The other construction of this embodiment is almost similar to those of the aforementioned first embodiment. The radius "r" of the lower toroidal cavity 12 should desirably be half to 100% of the radius Ro of the inscribed circle of the upper quadrilateral cavity 11.

Figure 10:
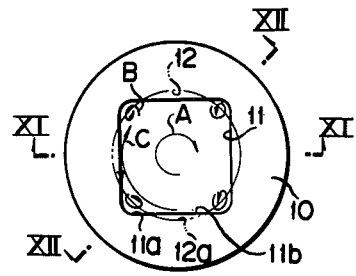
FIG. 10 is similar to FIG. 2 but showing still another embodiment of the present invention.
Figure 11:
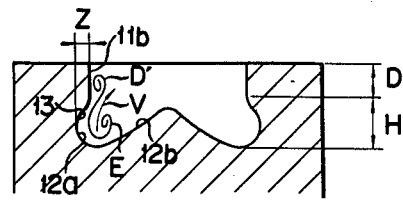
FIG. 11 is a cross-sectional view taken along the line XI—XI in FIG. 10.
Figure 12:
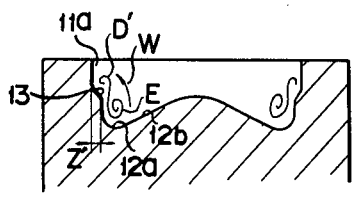
FIG. 12 is similar to FIG. 11 but showing a view taken along the line XII—XII in FIG. 10.

FIGS. 10, 11 and 12 indicate a further embodiment of the present invention. In this embodiment, the lower toroidal cavity 12 is located between the inscribed circle and the circumscribed circle of the upper quadrilateral cavity 12. In brief, the rounded corner 11a of the upper quadrilateral cavity 11 is located outside relative to the inner peripheral wall 12a of the lower toroidal cavity 12, and a rectilinear inner peripheral wall 11b is located inside relative to the inner peripheral wall 12a of the lower toroidal cavity 12. The other construction of this embodiment is almost similar to those of the aforementioned first and second embodiments. In this embodiment, a dimensional difference Z between the inner peripheral wall 11b of the quadrilateral cavity 11 and the inner peripheral wall 12a of the toroidal cavity 12 and a dimensional difference Z' between the rounded corner 11a of the quadrilateral cavity 11 and the inner peripheral wall 12a of the toroidal cavity 12 differ in the circumferential direction so that the intensities of turbulence "D" of a small scale and turbulence "E" of a small scale differ in the circumferential direction. As a result, shear flows can be produced in those regions and so the turbulences "D" and "E" of a small scale will become more complex. Further, because the inner peripheral wall 11b of the quadrilateral cavity 11 is located inside relative to the inner peripheral wall 12a of the toroidal cavity 12 by a dimension of Z, an air flow V towards the inside of the combustion chamber will be produced in the region between them whilst since the rounded corners 11a of the quadrilateral cavity 11 are located outside relative to the inner peripheral wall 12a of the toroidal cavity 12 by a dimension of Z', an air flow W towards the outside of the combustion chamber will be produced in the region defined between them. Consequently, the upper large swirl "A" and the lower large swirl "C" will be made in wave form thereby forming more complicated air flows. Thus, various forms of swirls and turbulences are produced within the combustion chamber, and the swirls take wave form so that the fuel combustion speed or rate can be increased thereby lightening the color of exhaust gas and reducing the fuel consumption rate.

Figure 13:
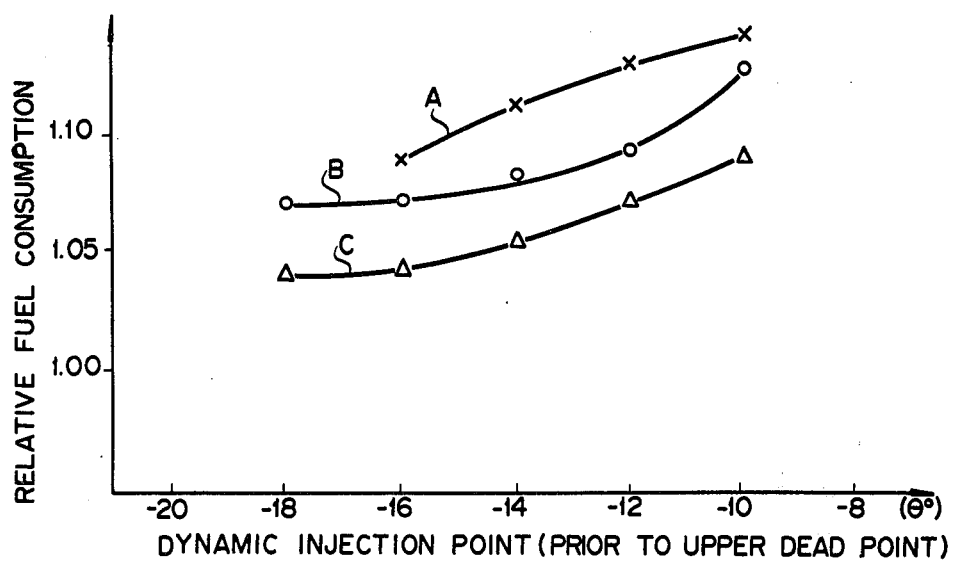
FIG. 13 is a graph showing a relationship between relative fuel consumption and dynamic fuel injection point prior to the upper dead point during high engine speed region wherein reference character "A" represents a conventional toroidal combustion chamber, "B" a conventional polygonal combustion chamber and "C" a combustion chamber of the present invention.
Figure 14:
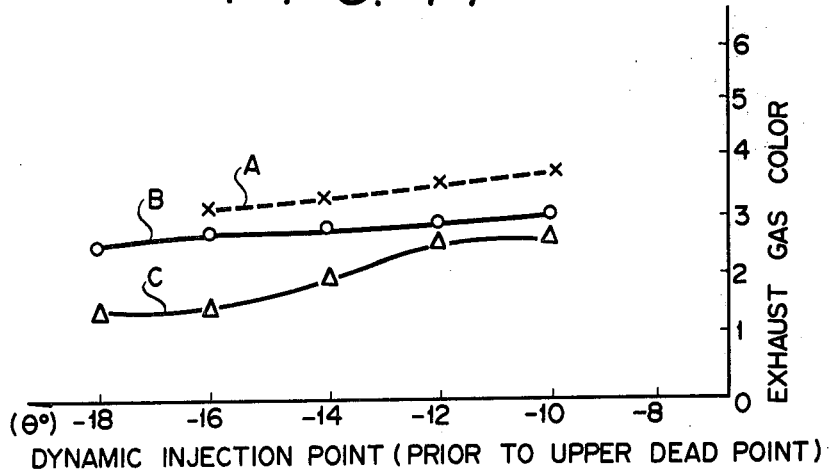
FIG. 14 is a graph showing a relationship between relative exhaust gas color and dynamic fuel injection point prior to the upper dead point during high engine speed region wherein reference characters A, B and C represents the same combustion chambers as that of FIG. 13.
Figure 15:
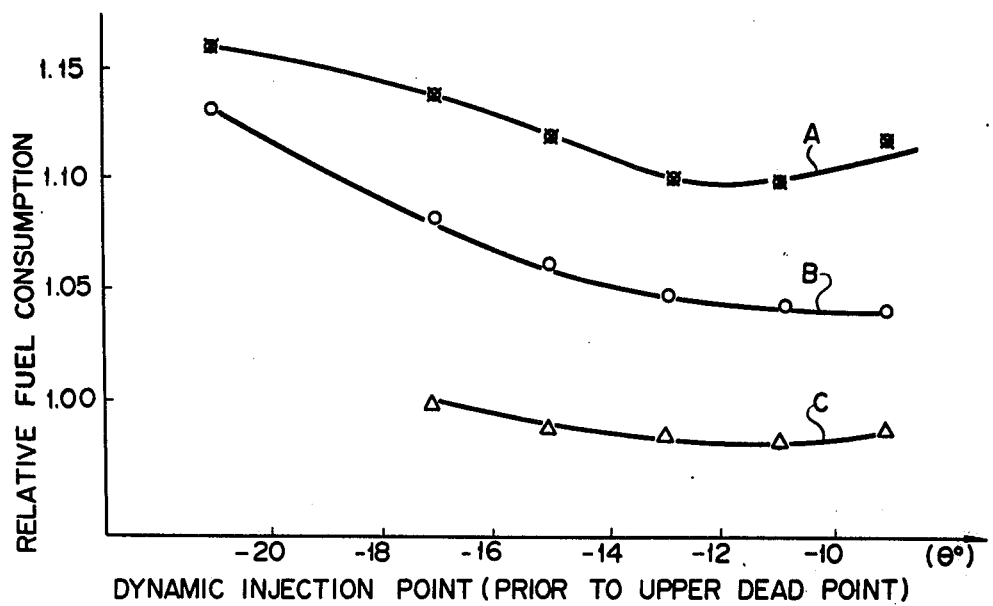
FIG. 15 is similar to FIG. 13 but showing a relationship during low engine speed region.
Figure 16:
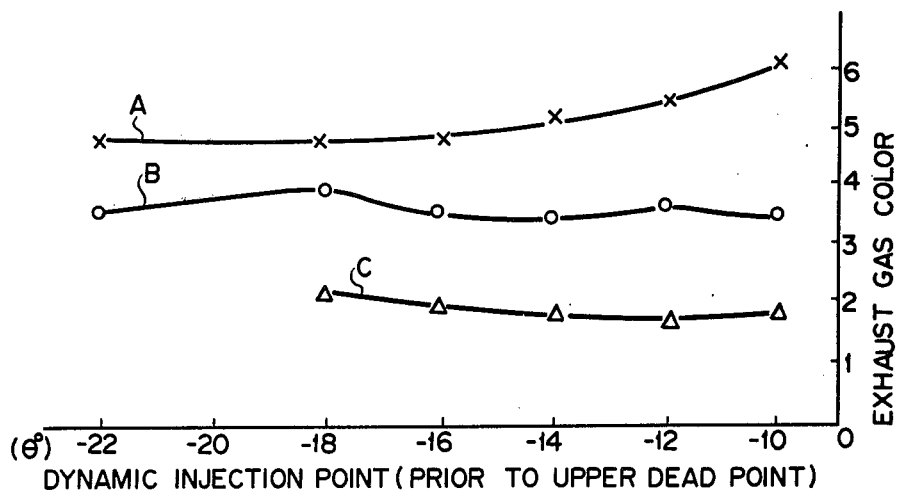
FIG. 16 is similar to FIG. 14 but showing a relationship during low engine speed region.

Measurements of fuel consumption rates and exhaust gas colors were made by using the combustion chamber according to the first embodiment of the present invention, the conventional quadrilateral combustion chamber and the toroidal combustion chamber and by altering the fuel injection timing variously at high speed rotation and low speed rotation. The experimental results obtained thereby are as shown in FIGS. 13, 14, 15 and 16. Reference character "A" indicates the result obtained by the toroidal combustion chamber, "B" the result obtained by the quadrilateral combustion chamber, and "C" the result obtained by the combustion chamber according to the first embodiment of the present invention. FIGS. 13 and 14 show the results obtained at high speed rotation and FIGS. 15 and 16 show the results obtained at low speed rotation, respectively.

The combustion chamber according to the present invention was constructed such that the radius "Ro" of the inscribed circle of the upper quadrilateral cavity 11 is 27 mm, the radius "R" of the corner square parts 11a is 10 mm, the depth "D" of the upper cavity 11 is 11.3 mm, the radius "r" of the lower toroidal cavity 12 is 30.5 mm and the depth H of the lower cavity 12 is 9 mm.

It can be seen from the above-mentioned results that the combustion chamber of the present invention is superior to the conventional ones in the fuel consumption rate and the color of exhaust gas under the conditions of high speed rotation and low speed rotation.

Since the present invention is constructed as mentioned hereinabove, the upper large swirl "A" and the lower large swirl "C" can be produced in the upper quadrilateral cavity 11 and the lower toroidal cavity 12, respectively, and turbulences "B" of a small scale can be produced in the corner square parts 11a, and the swirl speed of the lower large swirl "C" is higher than that of the upper large swirl "A", and so the turbulence "F" due to shear flow can be produced therebetween.

Consequently, even if the ratio R/Ro of the radius of the corner square parts 11a to that of the inscribed circle of the upper quadrilateral cavity 11 is reduced so as to increase the intensity of the turbulences "B" of a small scale, there is little energy loss in the whole combustion chamber because of the high swirl speed of the lower large swirl "C" within the lower toroidal cavity 12.

Therefore, strong turbulences "B" of a small scale, the large swirls "A" and "C" and the turbulence "F" are produced in the combustion chamber so as to cause a strong air flow therein so that the fuel particles and air can be mixed locally by the strong turbulences "B" of a small scale and also the fuel and air can be satisfactorily mixed within the combustion chamber by the action of the large swirls "A" and "C" and the turbulence "F" thereby increasing the combustion speed or rate after the ignition of fuel and reducing the amount of emission of NOx and the level of noise generated by combustion. As a result, even if the fuel injection timing is delayed to some degree, the fuel consumption rate can be reduced and the color of exhaust gas can be lightened.

Further, according to the present invention, the upper cavity 11 is equilateral polygonal and the lower cavity 12 is toroidal so that the lower large swirl "C" having a high swirl speed can be produced or kept in the lower toroidal cavity 12, and during the down stroke of the piston the lower large swirl "C" may enter the upper equilateral polygonal cavity 11 thereby passing swirls through the whole combustion chamber and permitting the fuel particles remaining after completion of injection to be burnt perfectly.

For this reason, the fuel combustion speed or rate after the ignition thereof can be increased further thereby reducing the fuel consumption rate and lightening the color of exhaust gas emitted from the combustion chamber.

It is to be understood that the foregoing description is merely illustrative of the preferred embodiment of the present invention and that the scope of the present invention is, not to be limited thereto, but is to be determined by the scope of the appended claims.

What we claim is:

1. In an internal combustion engine of the direct injection type including combustion chambers each defined by a cylinder head, a cylinder liner, and a piston head having a wall defining a cavity therein, means for producing air swirl in said cavity and fuel injection means each having a plurality of fuel injection nozzles, said fuel injection means being mounted substantially at the central part of said cavity, said nozzles being arranged to inject jets of fuel into said cavity radially against said cavity wall, the improvement wherein said cavity wall is constructed to define a generally equilateral polygonal cavity formed in the upper part thereof and a generally toroidal cavity formed in the lower part thereof, the ratio of the depth of said equilateral polygonal cavity to that of toroidal cavity being about 0.3 to about 1.2.

2. The engine according to claim 1 wherein said fuel injection means is disposed to inject fuel obliquely against said wall at an angle ranging from about −5° to about 14° when measured downwardly relative to the plane extending from the nozzle to the boundary cavity wall connecting said polygonal cavity with said toroidal cavity.

3. The engine according to claim 2 wherein said fuel injection angle is about 0° to about 4°.

4. The engine according to claim 1 wherein the outermost radius of said toroidal cavity is larger than that of the circumscribed circle of said polygonal cavity.

5. The engine according to claim 1 wherein the outermost radius of said toroidal cavity is smaller than that of the inscribed circle of said polygonal cavity.

6. The engine according to claim 1 wherein the outermost radius of said toroidal cavity is larger than that of the inscribed circle of said polygonal cavity and smaller than that of the circumscribed circle of said polygonal cavity.

7. The engine according to claim 1 wherein the ratio of the depth of said polygonal cavity to that of toroidal cavity is about 0.5 to about 1.0.

* * * * *